United States Patent
Cho et al.

(10) Patent No.: US 9,917,681 B2
(45) Date of Patent: *Mar. 13, 2018

(54) METHOD AND APPARATUS FOR ALLOCATING ACKCH RESOURCES IN A WIRELESS COMMUNICATION SYSTEM

(71) Applicant: Samsung Electronics Co., Ltd., Gyeonggi-do (KR)

(72) Inventors: Joon-Young Cho, Gyeonggi-do (KR); Ju-Ho Lee, Gyeonggi-do (KR); Hwan-Joon Kwon, Gyeonggi-do (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,487

(22) Filed: Sep. 19, 2016

(65) Prior Publication Data

US 2017/0005769 A1  Jan. 5, 2017

Related U.S. Application Data

(60) Continuation of application No. 14/531,334, filed on Nov. 3, 2014, now Pat. No. 9,450,733, which is a (Continued)

(30) Foreign Application Priority Data

Apr. 26, 2007  (KR) .................. 10-2007-0041034

(51) Int. Cl.
*H04L 5/00* (2006.01)
*H04B 7/0452* (2017.01)
(Continued)

(52) U.S. Cl.
CPC ......... *H04L 5/0055* (2013.01); *H04B 7/0452* (2013.01); *H04L 1/1854* (2013.01); (Continued)

(58) Field of Classification Search
CPC ... H04L 5/0055; H04L 5/0023; H04L 1/1854; H04L 5/0053; H04L 1/1812; H04B 7/0452; H04W 72/00; H04W 72/0453
See application file for complete search history.

(56) References Cited

U.S. PATENT DOCUMENTS 7,586,834 B2 *  9/2009  Byun ................... H04L 1/1692
                                                              370/208
8,214,713 B2   7/2012  Hiraki et al.
(Continued)

FOREIGN PATENT DOCUMENTS

CN   1525164    9/2004
CN   1701533    11/2005
(Continued)

OTHER PUBLICATIONS

Samsung, "Performance of DL ACK/NACK Transmission", R1-071805, 3GPP RAN WG1 Meeting #48bis, Mar. 26-30, 2007.
(Continued)

*Primary Examiner* — Thai Nguyen
(74) *Attorney, Agent, or Firm* — The Farrell Law Firm, P.C.

(57) ABSTRACT

Methods and apparatuses are provided for wireless communication. A scheduling message is received that includes first information on at least one resource allocated for uplink transmission and second information. Data and a pilot are transmitted via the allocated at least one resource for uplink transmission. An ACK/NACK resource is identified based on a lowest index among at least one index of the allocated at least one resource for uplink transmission and the second information. An ACK/NACK signal is received in response to the transmitted data using the identified ACK/NACK resource.

24 Claims, 11 Drawing Sheets

Related U.S. Application Data continuation of application No. 13/289,625, filed on Nov. 4, 2011, now Pat. No. 8,880,084, which is a division of application No. 12/110,649, filed on Apr. 28, 2008, now Pat. No. 9,425,941.

(51) Int. Cl.
| | |
|---|---|
| *H04L 1/18* | (2006.01) |
| *H04W 72/00* | (2009.01) |
| *H04W 72/04* | (2009.01) |
| *H04W 72/12* | (2009.01) |
| *H04L 29/06* | (2006.01) |

(52) U.S. Cl.
CPC .......... *H04L 5/0023* (2013.01); *H04L 5/0053* (2013.01); *H04W 72/04* (2013.01); *H04L 1/1812* (2013.01); *H04L 29/06088* (2013.01); *H04W 72/00* (2013.01); *H04W 72/0453* (2013.01); *H04W 72/12* (2013.01)

(56) References Cited

U.S. PATENT DOCUMENTS

| | | | |
|---|---|---|---|
| 2002/0004407 A1 | 1/2002 | Simonsson | |
| 2003/0189892 A1 | 10/2003 | Son et al. | |
| 2004/0221218 A1 | 11/2004 | Grob et al. | |
| 2004/0255220 A1 | 12/2004 | Sudo | |
| 2005/0041589 A1 | 2/2005 | Kwon et al. | |
| 2005/0122898 A1 | 6/2005 | Jang et al. | |
| 2005/0128993 A1 | 6/2005 | Yu et al. | |
| 2005/0181735 A1 | 8/2005 | Hiraki et al. | |
| 2005/0286402 A1 | 12/2005 | Byun et al. | |
| 2006/0098752 A1 | 5/2006 | Song et al. | |
| 2007/0177631 A1* | 8/2007 | Popovic | H04J 4/00 370/478 |
| 2007/0201572 A1 | 8/2007 | Krauss et al. | |
| 2008/0095109 A1 | 4/2008 | Malladi et al. | |
| 2010/0182975 A1* | 7/2010 | Malladi | H04L 1/1664 370/330 |

FOREIGN PATENT DOCUMENTS

| | | |
|---|---|---|
| CN | 1701534 | 11/2005 |
| CN | 1742503 | 3/2006 |
| CN | 1773981 | 5/2006 |
| EP | 1 298 829 | 4/2003 |
| EP | 1 492 258 | 12/2004 |
| EP | 1 657 872 | 5/2006 |
| WO | WO 02/03566 | 1/2002 |
| WO | WO 03/084108 | 10/2003 |
| WO | WO 2004/098098 | 11/2004 |
| WO | WO 2005/117385 | 12/2005 |
| WO | WO 2006/071049 | 7/2006 |
| WO | WO 2008/085000 | 7/2008 |

OTHER PUBLICATIONS

Samsung, "Mapping of Control Channel Elements to Resource Elements", R1-071576, 3GPP TSG RAN WG1 Meeting #48bis, Mar. 26-30, 2007.

3GPP TS36.211 v100, 3rd Generation Partnership Project, Mar. 2007, section 6.

Chinese Office Action dated Oct. 30, 2014 issued in counterpart application No. 201210438695.2.

MCC, "Approved Report of 3GPP TSG RAN WG1 LTE AdHoc in Cannes" (Cannes, France, Jun. 27-30, 2006), R1-062449, 3GPP TSG RAN WGl Meeting #46, Aug. 28-Sep. 1, 2006, 60 pages.

Motorola, "Downlink Acknowledgment and Group Transmit Indicator Channels", R1-071357, 3GPP TSG RAN1 #48bis, Mar. 26-30, 2007, 4 pages.

Texas Instruments, "ACK/NAK Channel Transmission in E-UTRA Downlink", R1-070277, 3GPP TSG RAN WG1#47bis, Jan. 15-19, 2007, 9 pages.

European Search Report dated Sep. 6, 2017 issued in counterpart application No. 08753186.9-1874, 7 pages.

* cited by examiner

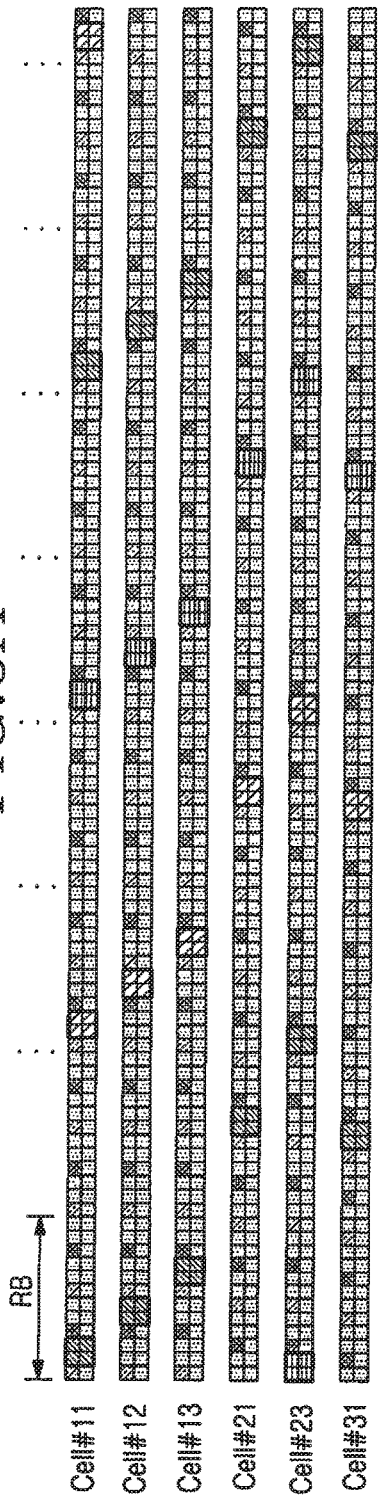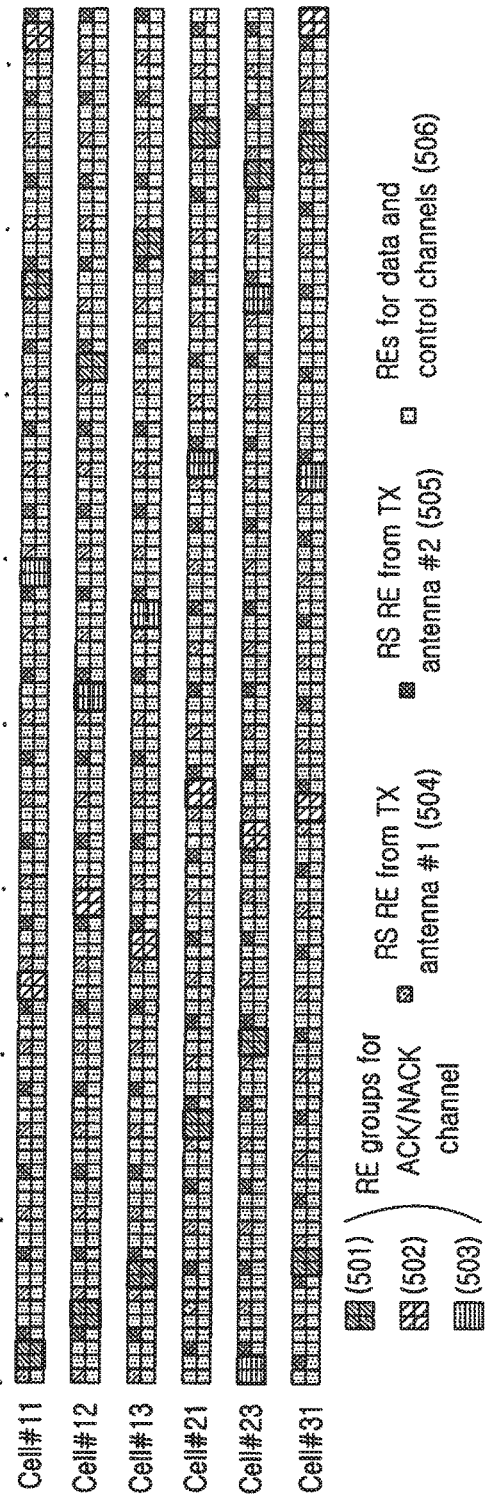

| UE ID (1000) | Resource indication (1001) | Transport format (1002) | HARQ information (1003) | MU-MIMO UE flag bit (1004) |

METHOD AND APPARATUS FOR ALLOCATING ACKCH RESOURCES IN A WIRELESS COMMUNICATION SYSTEM

PRIORITY

This application is a Continuation Application of U.S. patent application Ser. No. 14/531,334, filed in the U.S. Patent and Trademark Office (USPTO) on Nov. 3, 2014, which is a Continuation Application of U.S. patent application Ser. No. 13/289,625, filed in the USPTO on Nov. 4, 2011, now U.S. Pat. No. 8,880,084, issued on Nov. 4, 2014, which is a Divisional Application of U.S. patent application Ser. No. 12/110,649, filed in the USPTO on Apr. 28, 2008, now U.S. Pat. No. 9,425,941, issued on Aug. 23, 2016, which claims priority under 35 U.S.C. § 119(a) to a Korean Patent Application filed in the Korean Intellectual Property Office on Apr. 26, 2007 and assigned Serial No. 10-2007-0041034, the contents of each of which are incorporated herein by reference.

BACKGROUND

1. Field

The present invention generally relates to a resource allocation method and apparatus for a wireless communication system, and in particular, to a method and apparatus for transmitting/receiving an Acknowledgement (ACK)/Negative Acknowledgement (NACK) signal in a wireless communication system.

2. Description of the Related Art

In wireless communication systems, the technology for controlling a transmission error during data transmission is generally classified into a Forward Error Correction (FEC) technique and an Automatic Repeat reQuest (ARQ) technique. The FEC technique attempts to correct an error detected from received data, and decodes correct data upon success in the error correction. However, when the FEC technique has failed in the error correction, wrong information may be provided to users or the information may be missing. The ARQ technique transmits data using an FEC code having a high error detection capability, and when an error is detected from received data, a reception side sends a request for data retransmission to a transmission side.

The FEC technique has a relatively lower efficiency in a good channel environment, and reduces system reliability when the FEC technique fails in the error correction. On the contrary, the ARQ technique typically secures high system reliability and enables efficient transmission with a low redundancy, but the system reliability is considerably reduced in a poor channel environment due to the frequent retransmission request. In order to address such shortcomings, the two techniques have been appropriately combined to provide a Hybrid ARQ (HARQ) technique.

The HARQ technique basically attempts error correction on received coded data, referred to herein as a HARQ packet, and determines whether to make a retransmission request for the HARQ packet using a simple error detection code, such as a Cyclic Redundancy Check (CRC) code. A reception side of a system using the HARQ technique determines presence/absence of an error in a received HARQ packet, and transmits an HARQ Positive Acknowledgement (ACK) signal or an HARQ Negative Acknowledgement (NACK) signal to a transmission side according to the presence/absence of an error. The transmission side performs retransmission of the HARQ packet or transmission of a new HARQ packet according to the HARQ ACK/NACK signal. Upon normal receipt of an HARQ packet, the reception side transmits the ACK/NACK signal using appropriate resources. Particularly, when the HARQ technique is used, a channel over which the ACK/NACK signal is transmitted is called a Physical Hybrid ARQ Indicator Channel (PHICH).

An Orthogonal Frequency Division Multiplexing (OFDM)-based wireless communication system transmits the ACK/NACK signal on several subcarriers, and a Wideband Code Division Multiple Access (WCDMA) system transmits the ACK/NACK signal on a particular code channel. Generally, since packet data for several users is simultaneously transmitted in an arbitrary packet data transmission interval or Transmission Time Interval (TTI), ACKCHs for each of the HARQ packets are transmitted at particular times after the data received from the users which are scheduled data in the TTI is decoded.

Transmission of the ACKCH will be considered below separately for the downlink and the uplink. Regarding ACKCH for downlink data channels, each terminal or User Equipment (UE) that has received each of the data channels from a base station is allocated physical channel resources for transmitting the ACK/NACK signal from the base station, and transmits the ACKCH on the uplink. Meanwhile, regarding ACKCH for uplink data channels, after a base station receives the data channels from corresponding UEs, the base station transmits ACKCH for each data packet over the resources agreed upon between the base station and each UE.

FIG. 1 illustrates a conventional OFDM-based downlink frame structure of Enhanced Universal Terrestrial Radio Access (EUTRA) which is the next generation mobile communication standard of the 3$^{rd}$ Generation Partnership Project (3GPP). Referring to FIG. 1, a total of 50 Resource Blocks (RBs) 102 exist in a 10-MHz system bandwidth 101. One RB is composed of 12 subcarriers 103, and can have 14 OFDM symbol intervals 104. In every OFDM symbol interval 104, a modulation symbol of a downlink channel is transmitted on each subcarrier 103. As shown above, one subcarrier band in one OFDM symbol interval is referred to as a Resource Element (RE) 106, and in FIG. 1, a total of 168 (=14 OFDM symbols×12 subcarriers) REs exist in one RB. In one OFDM symbol interval 104, one downlink data channel can be allocated to one or more RBs according to a data rate, and can be transmitted through the allocated RBs.

With consideration of the downlink frame structure of FIG. 1, a maximum of 50 downlink data channels can be simultaneously scheduled in one TTI 105. In this case, the uplink needs 50 ACKCHs. Generally, a group of multiple REs 106 constitutes one ACKCH, and the overhead and performance occupied by the ACKCH in all resources of the system depends on how resources of the ACKCH are formed.

Therefore, in order to improve the overhead and performance occupied by ACKCH in all resources of the system, a need exists for a scheme for efficiently allocating and forming resources of the ACKCH.

SUMMARY

The present invention has been made to address at least the above problems and/or disadvantages and to provide at least the advantages described below. Accordingly, an aspect of the present invention provides a methods and apparatus for receiving/transmitting an ACK/NACK signal in a wireless communication system.

According to an aspect of the present invention, a method is provided for wireless communication. A scheduling message is received including first information on at least one resource allocated for uplink transmission and second information. Data and a pilot are transmitted via the allocated at least one resource for uplink transmission. An ACK/NACK resource is identified based on a lowest index among at least one index of the allocated at least one resource for uplink transmission and the second information. An ACK/NACK signal is received in response to the transmitted data using the identified ACK/NACK resource.

According to another aspect of the present invention, an apparatus is provided for wireless communication. The apparatus includes a transceiver configured to receive a scheduling message comprising first information on at least one resource for uplink transmission and second information, transmit data and a pilot via the allocated at least one resource for uplink transmission, and receive an ACK/NACK signal in response to the transmitted data. The apparatus also includes a controller configured to identify an ACK/NACK resource based on a lowest index among at least one index of the allocated at least one resource for uplink transmission and the second information, and control the transceiver to receive the ACK/NACK signal using the identified ACK/NACK resource.

According to an additional aspect of the present invention, a method is provided for wireless communication. A scheduling message is transmitted that includes first information on at least one resource allocated for uplink transmission. Data and a pilot are received via the allocated at least one resource for uplink transmission. An ACK/NACK resource is identified based on a lowest index among at least one index of the allocated at least one resource for uplink transmission and the second information. The ACK/NACK signal is transmitted in response to the received data using the identified ACK/NACK resource.

According to a further aspect of the present invention, an apparatus is provided for wireless communication system. The apparatus includes a transceiver configured to transmit a scheduling message comprising first information on at least one resource allocated for uplink transmission, receive data and a pilot via the allocated at least one resource for uplink transmission, and transmitting an ACK/NACK signal in response to the received data. The apparatus also includes a channel decoder for decoding the received data, and an ACK/NACK generator for generating the ACK/NACK signal corresponding to the decoded data. The apparatus further includes a controller for identifying an ACK/NACK resource based on a lowest index among at least one index of the allocated at least one resource for uplink transmission and second information, and control the transceiver to transmit the generated ACK/NACK signal using the identified ACK/NACK resource.

BRIEF DESCRIPTION OF THE DRAWINGS

The above and other aspects, features and advantages of the present invention will become more apparent from the following detailed description when taken in conjunction with the accompanying drawings in which:

FIGS. 5A and 5B are diagrams illustrating a situation in which downlink channels are mapped to REs separately for each cell according to the first embodiment of the present invention;

DETAILED DESCRIPTION

Preferred embodiments of the present invention will now be described in detail with reference to the annexed drawings. In the following description, a description of known functions and configurations incorporated herein has been omitted for clarity and conciseness. Terms used herein are based on functions in the present invention and may vary according to users, operators' intention or usual practices. Therefore, the definition of the terms should be made based on contents throughout the specification. In particular, Acknowledgement (ACK)/Negative Acknowledgement (NACK) physical channel (ACKCH) and Physical Hybrid Automatic Repeat reQuest Indicator Channel (PHICH) used throughout this disclosure each indicate a channel over which an ACK/NACK signal is transmitted.

Although embodiments of the present invention will be described below mainly for an Orthogonal Frequency Division Multiplexing (OFDM)-based wireless communication system, especially for the $3^{rd}$ Generation Partnership Project (3GPP) Enhanced Universal Terrestrial Radio Access (EUTRA) standard, those skilled in the art should understand that the present invention can be applied to other communication systems having the similar technical background and channel format with a slight modification without departing from the spirit and scope of the invention.

Figure 2A:
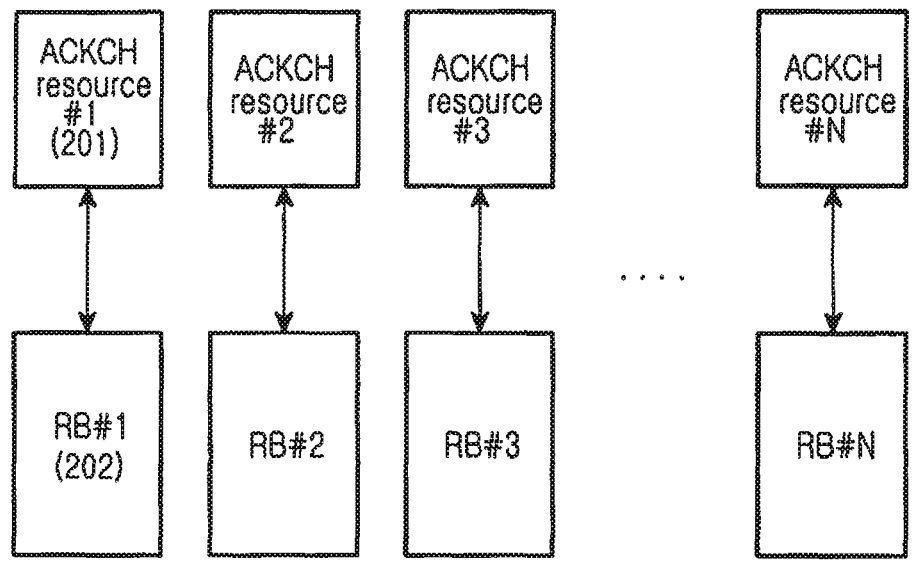
FIGS. 2A and 2B are diagrams illustrating an example where ACKCH resources have an implicit mapping relation with a data channel or a scheduling control channel according to the present invention.
Figure 2B:
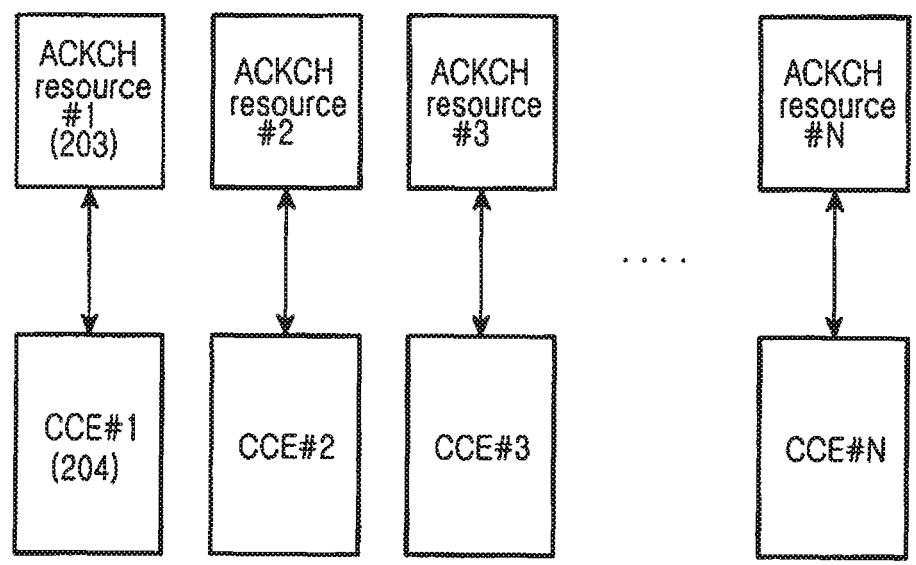

The present invention provides a method and apparatus for allocating resources for ACKCH in a wireless communication system. FIGS. 2A and 2B are diagrams illustrating an example where ACKCH resources have an implicit mapping relation with a data channel(s) or scheduling control channel(s). According to the present invention, as shown in FIGS. 2A and 2B, when ACKCH resource #1 201 has an implicit mapping relation with RB#1 202 used for transmission of a data channel or when ACKCH resource #1 203 has an implicit mapping relation with downlink Control Channel Element (CCE) 204 where data transmitted over the data channel is scheduled, the ACKCH resources existing in several frequency domains in the system band are uniformly used without being concentrated on a particular frequency domain. Implicit mapping, as used herein, refers to pre-defined mapping, and indicates that a UE, when transmitting or receiving an ACK/NACK channel, can determine which resource the UE should use, through use of pre-defined mapping between ACK/NACK channel resource and data channel RB or pre-defined mapping between ACK/NACK channel resource and scheduling control channel, without the need to explicitly receive signaling information from a base station.

In addition, the present invention maps an ACKCH to a physical resource to improve frequency diversity gain and inter-cell interference diversity gain.

Further, the present invention uses the same Resource Block(s) (RB(s)) during Multi-User Multi-Input Multi-Output (MU-MIMO) transmission so ACKCHs from MU-MIMO User Equipments (UEs) receiving transmission data can be transmitted to a base station without mutual interference. In particular, the present invention brings performance improvement of ACKCH and efficient utilization of resources when a technology is applied in which multiple ACKCHs are transmitted after being mapped to the same frequency resource using Code Division Multiplexing (CDM).

An ACKCH resource allocation method and apparatus for a wireless communication system according to the present invention implicitly signals physical resources to be used for the ACKCH through use of a mapping relation preset between resources allocated to the data channel and resources allocated to the ACKCH, or between a downlink control channel where the data channel is scheduled and resources allocated to the ACKCH.

Regarding physical resources, i.e., a set of Resource Elements (REs), to be used for transmission of each ACKCH, the base station can explicitly provide corresponding information to a UE, or can allow the set of REs to be used for ACKCH transmission to have an implicit mapping relation with an RB used for transmission of a downlink data channel or with downlink CCE where data resources are scheduled, as shown in FIGS. 2A and 2B.

More specifically, referring to FIGS. 2A and 2B, the present invention maps physical resources to an ACKCH, when an implicit mapping rule is applied between an ACKCH and an RB of a data channel, or between an ACKCH and a downlink CCE. The core of the physical resource mapping method is to map ACKCHs being mapped to consecutive RBs or CCEs with consecutive indexes, to different frequency resources. The mapping process allows REs used for transmission of the ACKCHs to uniformly spread over the entire system band, so the ACKCH resource allocation method and apparatus according to the present invention can uniformly use frequency resources of ACKCHs and achieve good frequency diversity and inter-cell interference diversity in the system where consecutive RBs are allocated for one data channel, like a Single-Carrier Frequency Division Multiple Access (SC-FDMA) system.

Figure 1:
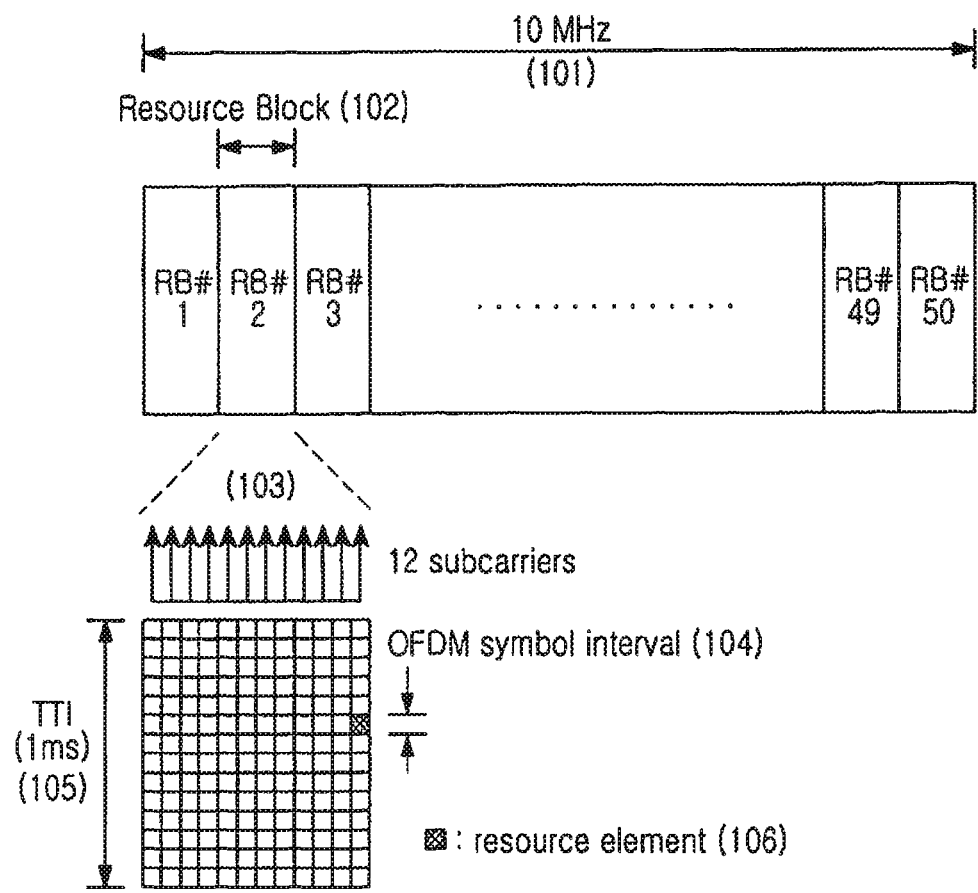
FIG. 1 is a diagram illustrating a conventional OFDM-based downlink frame structure.

As shown in FIGS. 2A and 2B, when implicit mapping is used, the base station has no need to explicitly signal ACKCH resources to a UE, contributing to a considerable reduction in or removal of signaling overhead of ACKCH resources. Shown in FIG. 2A is an example where ACKCH resources are mapped to N RBs on a one-to-one basis. Each ACKCH resource 201 in FIG. 2A is one physical channel composed of several REs 106 in FIG. 1, and when transmission of several ACKCHs is permitted through the same REs 106, they are different ACKCH resources 201 since they are different in CDM sequence used for distinguishing each ACKCH. If a UE transmits a data channel using RB#1 202, an ACKCH for the UE is transmitted from the base station using ACKCH resource #1 201 and the UE receives the corresponding ACKCH.

Meanwhile, shown in FIG. 2B is an example where ACKCH resources are implicitly mapped to CCE 204 of a downlink control channel for transmitting scheduling information of the data channel. In the above, CCE 204 indicates a set of REs 106 constituting the downlink control channel. For example, a UE, which is scheduled (allocated) an uplink data channel from a control channel based on CCE#1 204, transmits an ACK/NACK signal using ACKCH resource #1 203 mapped to the CCE#1 204. The downlink control channel can be composed of one or multiple CCEs according to the channel state of the UE receiving the control channel, and the amount of information transmitted over the control channel.

A description will now be made of an ACKCH resource mapping and signaling technology according to the present invention.

Figure 3:
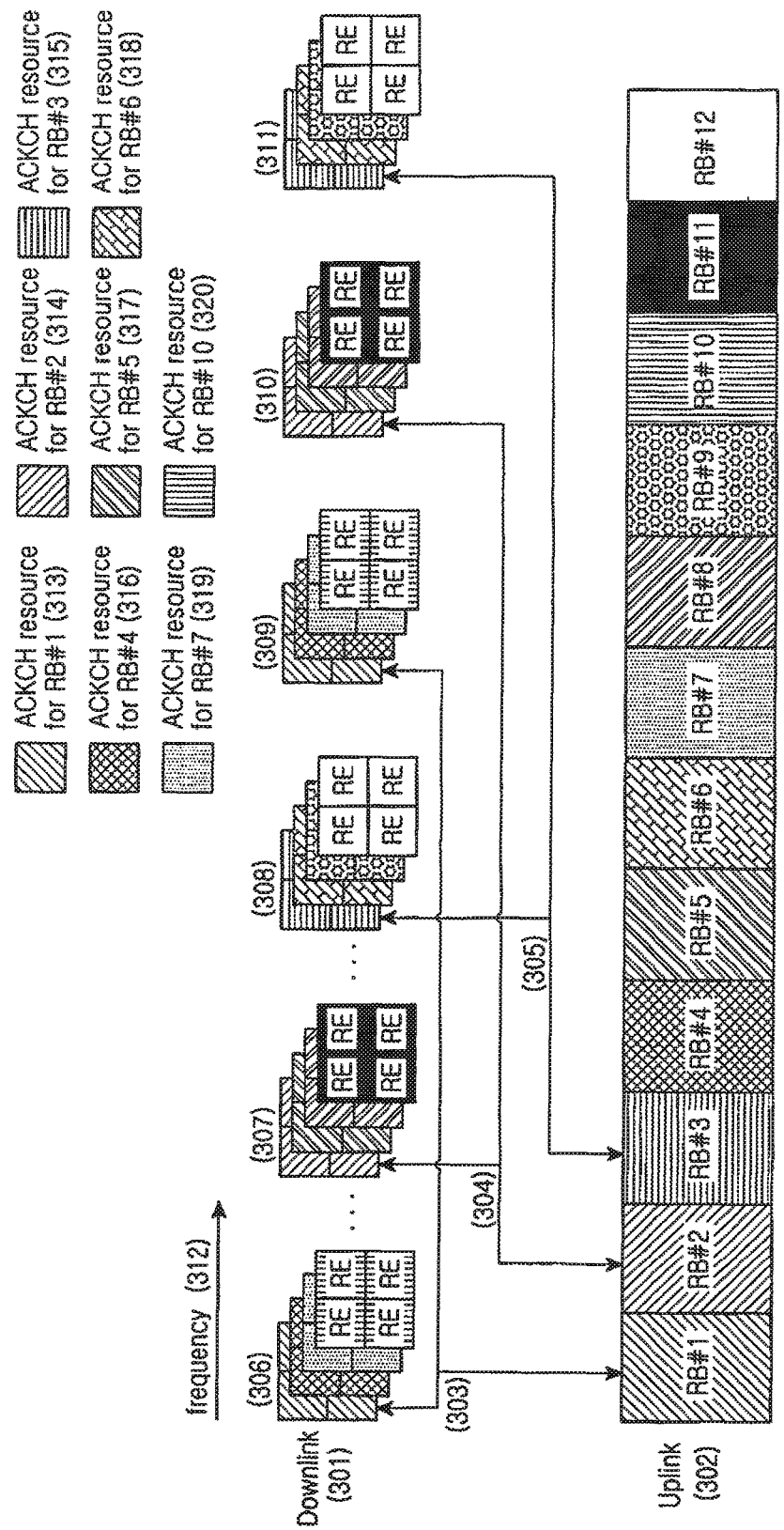
FIG. 3 is a diagram illustrating an ACKCH resource allocation method according to a first embodiment of the present invention.

FIG. 3 is a diagram illustrating an ACKCH resource allocation method according to a first embodiment of the present invention. In the first embodiment of the present invention, RBs 302 are allocated during data channel transmission in the uplink, REs 301 are used for ACKCH transmission for the uplink data channel in the downlink, and the remaining downlink REs are not shown for convenience.

Meanwhile, shown in FIGS. 5A and 5B is an example where REs 501, 502 and 503 used for transmission of ACKCH and REs 504, 505 and 506 used for transmission of the remaining channels such as Physical Downlink Control Channel (PDCCH) and Physical Downlink Shared Channel (PDSCH) are illustrated together. FIGS. 5A and 5B are diagrams illustrating the situation in which downlink channels are mapped to REs separately for each cell. REs denoted by reference numeral 306 and 309 in FIG. 3 correspond to REs denoted by reference numeral 501 in FIGS. 5A and 5B; REs denoted by reference numeral 307 and 310 in FIG. 3 correspond to REs denoted by reference numeral 502 in FIGS. 5A and 5B; and REs denoted by reference numeral 308 and 311 in FIG. 3 correspond to REs denoted by reference numeral 503 in FIGS. 5A and 5B.

In FIG. 3, since the horizontal axis 312 represents frequency, the REs spaced farther from each other are significantly different in frequency on the downlink transmission band. As shown in FIG. 3, REs denoted by reference numeral 306 and REs denoted by reference numeral 311 are located in the opposite sides on the transmission band. Although a description of the first embodiment is given herein as to downlink ACKCH for an uplink data channel, the same can be applied even to uplink ACKCH for a downlink data channel.

According to a mapping rule between uplink RB 302 and downlink ACKCH 301 shown in FIG. 3, since downlink ACKCH for uplink data channel transmitted using RB#1 is mapped to REs 306 and 309 (see 303), a base station transmits an ACK/NACK signal using the REs 306 and 309 after receiving the data channel from a UE, and the UE receives ACK/NACK signal from the REs through use of a particular mapping rule 303. Similarly, downlink ACKCH for the uplink data channel transmitted using RB#2 is transmitted using REs 307 and 310. The REs 306 and 309, and the Res 307 and 310 preferably have bands spaced apart to some extent in order to obtain frequency diversity gain.

The present invention is more advantageous to a case where more than two consecutive RBs are allocated for data channel transmission. Particularly, in the EUTRA uplink, since the SC-FDMA transmission scheme is used, consecutive RBs are usually allocated in order to satisfy the single-carrier transmission characteristic when more than two RBs are allocated for data channel transmission. For example, in FIG. 3, if RB#2 and RB#3 are allocated for transmission of a certain data channel and a UE transmits the data channel using the RBs, a base station can use REs 307, 308, 310 and 311 for ACKCH transmission by means of mapping rules 304 and 305. In this case, if the base station receiving the data channel transmits ACKCH using all the REs 307, 308, 310 and 311, an ACK/NACK signal is distributed over four RE groups 307, 308, 310 and 311 during transmission of the ACK/NACK signal, making it possible to improve frequency diversity and inter-cell interference diversity gains as several ACKCH frequency resources are uniformly used as compared with the case where only the RE groups 307 and 310, or 308 and 311 mapped to one RB are used.

If several ACKCH frequency resources are uniformly used in this way, performance reduction caused by the mutual interference between ACKCHs multiplexed to the concentrated frequency resources as ACKCH transmission is concentrated only on particular frequency resources can be prevented. Meanwhile, in this first embodiment, one RE group is composed of four adjacent REs, and the present invention is not limited to an RE group having a specific size and can be applied regardless of the number of REs belonging to the RE group.

According to the mapping method shown in FIG. 3, when a data channel is transmitted using three arbitrary consecutive RBs, ACKCH can be transmitted using all of six RE groups 306~311. For example, when RB#3, RB#4 and RB#5 are used for data channel transmission, all of ACKCH resources 315, 316 and 317 mapped to the three RBs are used, so the ACKCH is distributed over six RE groups 306~311 during transmission of the ACKCH. In this case, in each RE group, sequences allocated to the ACKCH resources 315, 316 and 317 are used.

In addition, four ACKCH resources 313, 316, 319 and 320 exist in the RE group 309 in order to transmit ACKCH mapped to RB#1, RB#4, RB#7 and RB#10, and the four ACKCH resources 313, 316, 319 and 320 are transmitted over the same frequency resources. The four ACKCH resources 313, 316, 319 and 320, as shown in FIG. 4, are allocated sequences having mutual orthogonality or quasi-orthogonality separately for each ACKCH resource so they can be distinguished in the code domain.

Figure 4:
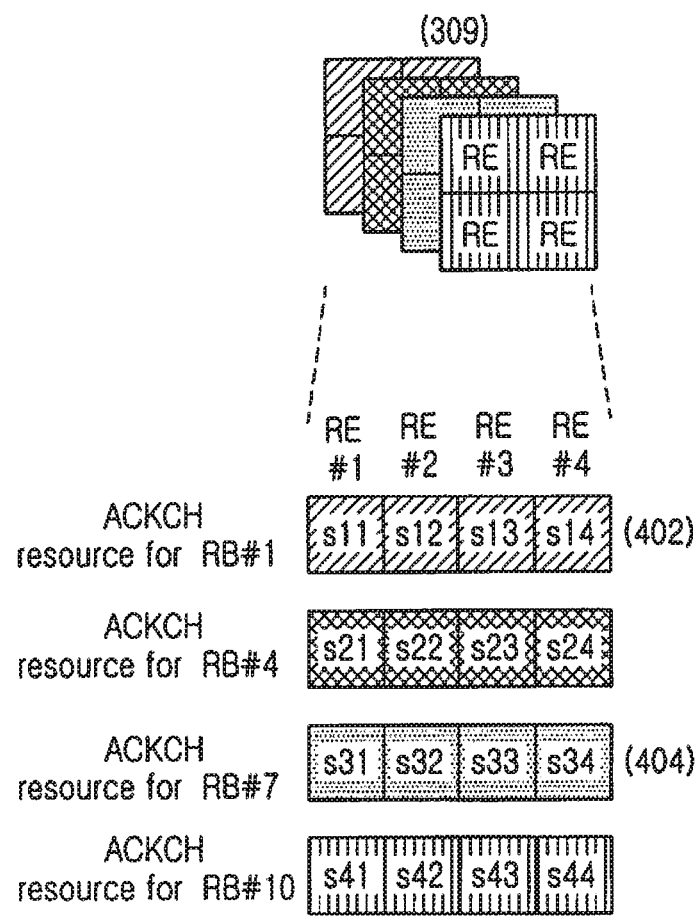
FIG. 4 is a diagram illustrating a process of mapping multiple ACKCHs to the same RE group according to the first embodiment of the present invention.

FIG. 4 is a diagram illustrating a process of mapping multiple ACKCHs to the same RE group according to the first embodiment of the present invention. For example, if an ACK/NACK signal to be transmitted is defined as 'b' when a ACKCH mapped to a data channel transmitted on RB#1 is transmitted, s11×b, s12×b, s13×b and s14×b are formed in the RE group 309 by multiplying the ACK/NACK signal b by sequences 402 of s11, s12, s13 and s14, respectively, and transmitted over RE#1, RE#2, RE#3 and RE#4, respectively. In the above process, the sequences 402 of s11, s12, s13 and s14 can be made by multiplying orthogonal sequences such as length-4 Walsh or DFT sequences by cell-specific random sequences. Since sequences having a long length are generally applied for the cell-specific random sequences, every RE group has a different sequence value.

Regarding ACKCH corresponding to a data channel transmitted on RB#7, an ACK/NACK signal to be transmitted on the RE group 309 are multiplied by sequences 404 of s31, s32, s33 and s34, and transmitted on RE#1, RE#2, RE#3 and RE#4, respectively. Therefore, according to this first embodiment, ACKCHs being mapped to RBs RB#1, RB#4, RB#7 and RB#10 spaced apart from each other can be transmitted by applying different sequences to the same frequency resource, i.e., by applying CDM. This is because ACKCHs belonging to consecutive RBs are mapped to different frequency resources in FIG. 3.

Although an example where length-4 sequences are applied separately for each RE group is shown in FIG. 3 and FIG. 4, if a real part and an imaginary part separately carry one sequence chip during ACK/NACK signal transmission, length-8 sequences can be applied. In this case, 8 different ACKCHs can be transmitted on one RE group.

Meanwhile, FIG. 5A showing an example where ACKCH resources are allocated to several cells is an example where RE groups 306~311 allocated to ACKCH of FIG. 3, referred to herein as ACKCH RE groups, are mapped to physical resources at regular frequency intervals. That is, RE groups 501, 502 and 503 correspond to RE groups 306, 307 and 308 of FIG. 3, respectively. The RE groups 501~503 are spaced apart from each other at intervals of two RBs. In FIGS. 5A and 5B, Cell#11, Cell#12 and Cell#13 are cells belonging to the same base station, and similarly, Cell#21 and Cell#23 are also cells belonging to the same base station. However, Cell#11, Cell#21 and Cell#31 are cells belonging to different base stations. Aside from the RE groups 501~503 for ACKCH transmission, FIGS. 5A and 5B show REs 504 and 505 mapped to a Reference Signal (RS) for channel estimation and REs 506 mapped to control channels and data.

According to the ACKCH transmission method shown in FIG. 3, ACKCH corresponding to a data channel transmitted using three or more arbitrary consecutive RBs can always be transmitted using all of RE groups 501, 502, 503, making it possible to improve frequency diversity gain and inter-cell interference diversity gain as compared with the case where only one of the RE groups 501~503 is used. Similarly, when two consecutive RBs are allocated for data channel transmission, two RE groups among the RE groups 501~503 are always selected for transmission of ACKCH, making it possible to obtain improved performance.

Meanwhile, each ACKCH RE group shown in FIG. 5A has a cell-specific offset to reduce interference between ACKCHs of different cells. For example, since Cell#11, Cell#12 and Cell#13 belong to the same base station, ACKCHs from the cells are transmitted on different REs, preventing occurrence of mutual interference. However, since there is a limitation on the applicable offset value, there is a possible case where some ACKCHs from different cells use the same REs as done in Cell#21 and Cell#31.

Shown in FIG. 5B is an example where the ACKCH RE groups 306~311 have the cell-specific random frequency interval. Therefore, while RE groups corresponding to ACKCHs show a distance difference corresponding to the same frequency offset between two arbitrary cells in FIG. 5A, an interval between ACKCH RE groups is random in FIG. 5B, making it possible to more randomize interference from ACKCHs of different cells. Even in FIG. 5B, regarding ACKCH RE mapping with RB in each cell, when more than two consecutive RBs are used for data channel transmission as described above, at least two RE groups among the RE groups 501~503 are used for ACKCH transmission, contributing to improvement of frequency diversity, and since random inter-cell ACKCH RE mapping is applied, an inter-cell ACKCH interference randomization effect can further increase.

Figure 6:
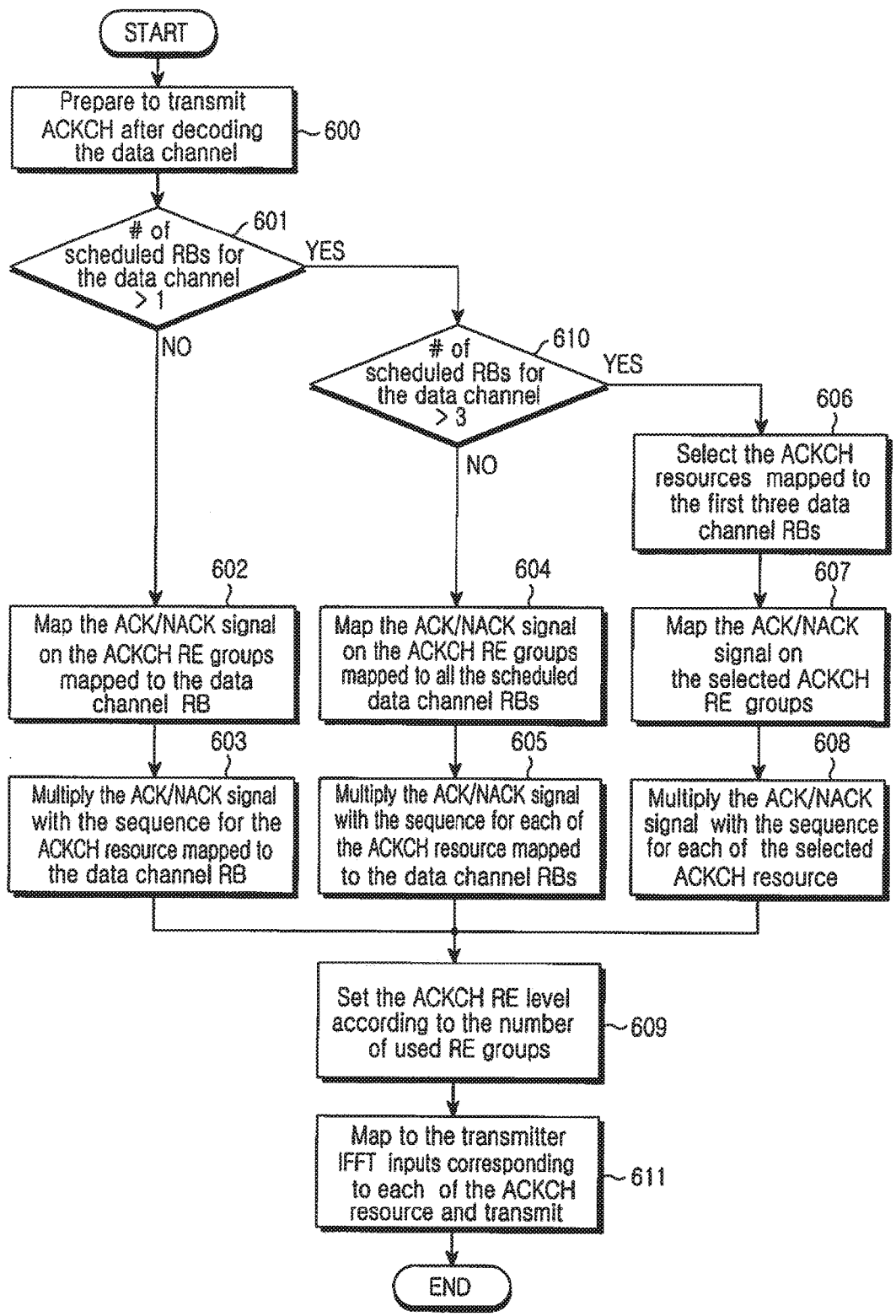
FIG. 6 is a control flow diagram illustrating an ACKCH transmission procedure of a transmission apparatus of a base station according to the first embodiment of the present invention.

FIG. 6 is a control flow diagram illustrating an ACKCH transmission procedure of a transmission apparatus of a base station according to the first embodiment of the present invention. In the transmission procedure of FIG. 6, when multiple RBs are allocated to a data channel, the RBs are assumed to be consecutive to each other. In step 600, the transmission apparatus of the base station determines an ACK/NACK value according to the decoding result on a data channel received from a UE, and prepares to transmit an ACKCH signal. In step 601, the transmission apparatus of the base station checks the number of RBs allocated to the received data channel, and when only one RB is allocated for the data channel, the transmission apparatus of the base station maps an ACK/NACK signal to an ACKCH RE group mapped to the RB in step 602. Thereafter, in step 603, the transmission apparatus of the base station multiplies the ACK/NACK signal by a CDM sequence for each of the ACKCH resources separately for each RE. Referring to FIG. 4, when RB#1 is allocated to the data channel, a sequence allocated to ACKCH resource of a corresponding RE group is multiplied separately for each RE group as shown by reference numeral 402.

Since three different RE groups 501, 502 and 503 are defined as frequency resources for transmitting ACKCH as shown in FIGS. 5A and 5B, the transmission apparatus of the base station determines in step 610 whether the number of RBs allocated for transmission of the data channel is greater than three, and when two or three RBs are allocated to the data channel, the transmission apparatus of the base station maps a transmission ACK/NACK signal to an ACKCH RE group mapped to the RBs in step 604. Referring to FIG. 3, when RB#2 and RB#3 are allocated to the data channel, the transmission apparatus of the base station maps the ACK/NACK signal to RE groups 307, 308, 310 and 311 mapped thereto. When the number of sets of frequency resources for transmitting ACKCH is not three, the number of RBs, which is a criterion for determination in step 610, can be changed according thereto. Meanwhile, the number of RBs, which is a criterion for determination in step 610, can be set to two rather than three regardless of the number of sets. In this case, when multiple RBs are allocated to the data channel, the transmission apparatus of the base station only needs to always use only two ACKCH resources regardless of the number of allocated RBs. In step 605, the transmission apparatus of the base station multiplies each of RE groups, to which the ACK/NACK signal is mapped in step 604, by a corresponding CDM sequence.

However, if the base station determines in step 610 that the number of RBs allocated to the data channel exceeds three, the transmission apparatus of the base station selects ACKCH resources mapped to RBs corresponding to the first three indexes among the RBs in step 606. Referring to FIG. 3, when RB#2~RB#7 are allocated to the data channel, ACKCH resources 314, 315 and 316 corresponding to RB#2, RB#3 and RB#4 are selected. In step 607, the transmission apparatus of the base station maps the ACK/NACK signal to the ACKCH resources selected in step 606. In step 608, the transmission apparatus of the base station multiplies the ACK/NACK signal by CDM sequences corresponding to the ACKCH resources separately for each RE group.

Thereafter, in step 609, the transmission apparatus of the base station adjusts a transmission level of a signal on ACKCH RE according to the number of RE groups used for ACKCH channel transmission for the data channel. For example, when the number of RBs allocated to the data channel is three, the level is adjusted to ⅓, compared to when the number of RBs is one. This is to keep the total power of the transmission ACKCH signal constant regardless of the number of RE groups used for the ACKCH transmission. Finally, in step 611, the ACKCH signal is mapped to a corresponding Inverse Fast Fourier Transformer (IFFT) input of the transmitter separately for each RE allocated for the ACKCH, and then transmitted. The same transmission procedure can be applied even when the number of RBs allocated to the data channel, which is a criterion for determination in step 610, is set to two and ACKCH resources corresponding to the first two RBs are selected in step 606.

Figure 7:
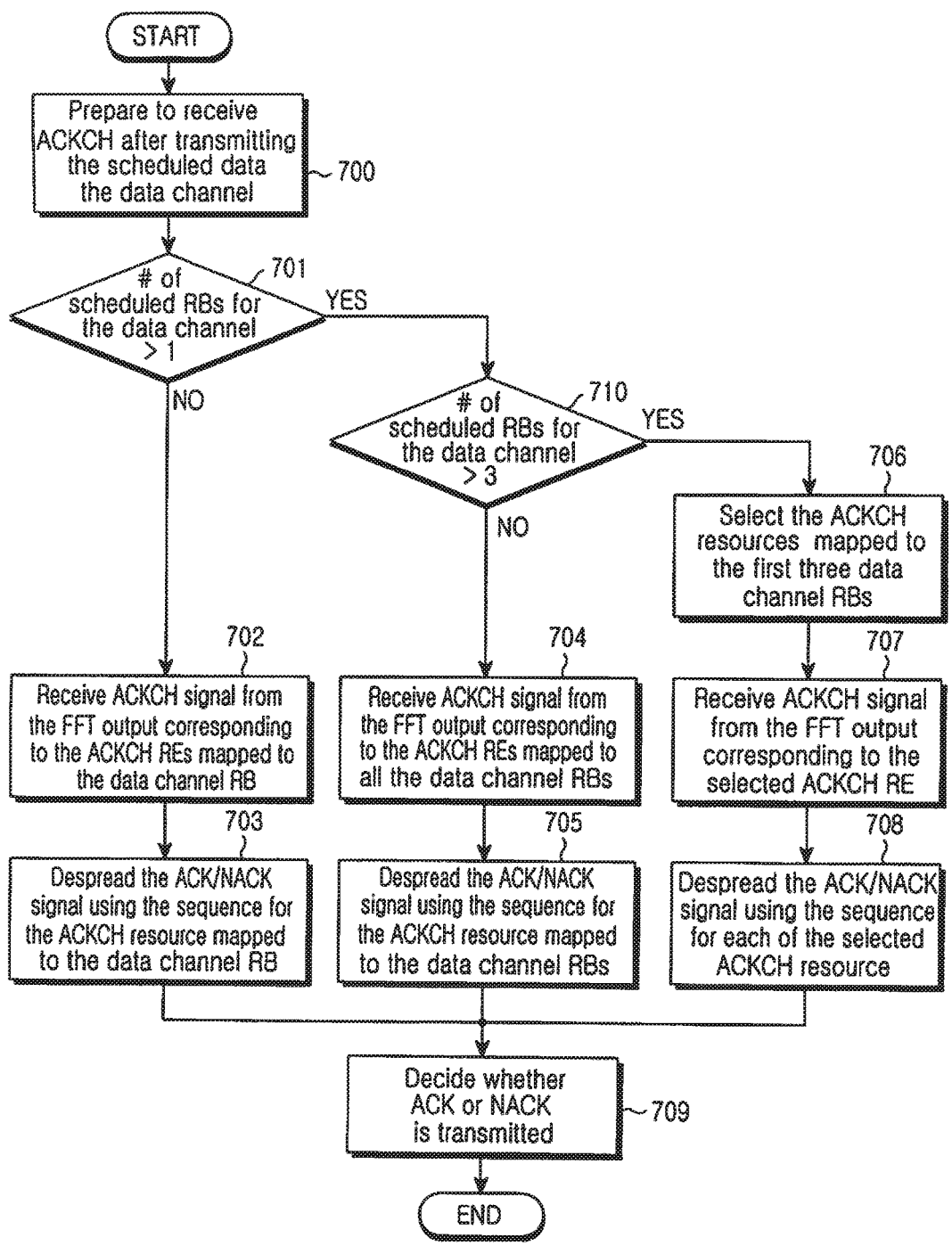
FIG. 7 is a control flow diagram illustrating an ACKCH reception procedure of a reception apparatus of a UE according to the first embodiment of the present invention.

FIG. 7 is a control flow diagram illustrating an ACKCH reception procedure of a reception apparatus of a UE according to the first embodiment of the present invention. In step 700, the UE prepares to receive ACKCH from a base station after transmitting a previously scheduled data channel. Thereafter, the UE determines the number of RBs scheduled for the data channel in step 701, and if only one RB is allocated, the UE receives the ACKCH signal from the Fast Fourier Transformer (FFT) outputs of the receiver corresponding to ACKCH REs mapped to the RB in step 702. In step 703, the UE despreads the ACKCH signal received in step 702 using sequences corresponding to the ACKCH resources.

However, if the UE determines in step 701 that the number of RBs scheduled for the data channel is greater than one, the UE proceeds to step 710 where the UE determines whether the number of RBs allocated to the data channel is greater than three. If the number of allocated RBs is two or three, the UE proceeds to step 704 where the UE receives the ACKCH signal from FFT outputs corresponding to the ACKCH REs mapped to the RBs. Thereafter, in step 705, the UE despreads the ACKCH signal received in step 704 using sequences corresponding to the ACKCH resources.

However, if the UE determines in step 710 that the number of RBs allocated to the data channel is greater than three, the UE proceeds to step 706 where the UE selects ACKCH resources mapped to the first three RB indexes among the RBs. Thereafter, the UE receives an ACKCH signal from FFT outputs corresponding to the selected resources in step 707, and then despreads the received ACKCH signal using sequences corresponding to the ACKCH resources in step 708. Thereafter, in step 709, the UE determines whether an ACK/NACK signal is received from the despread ACKCH signal.

Figure 8:
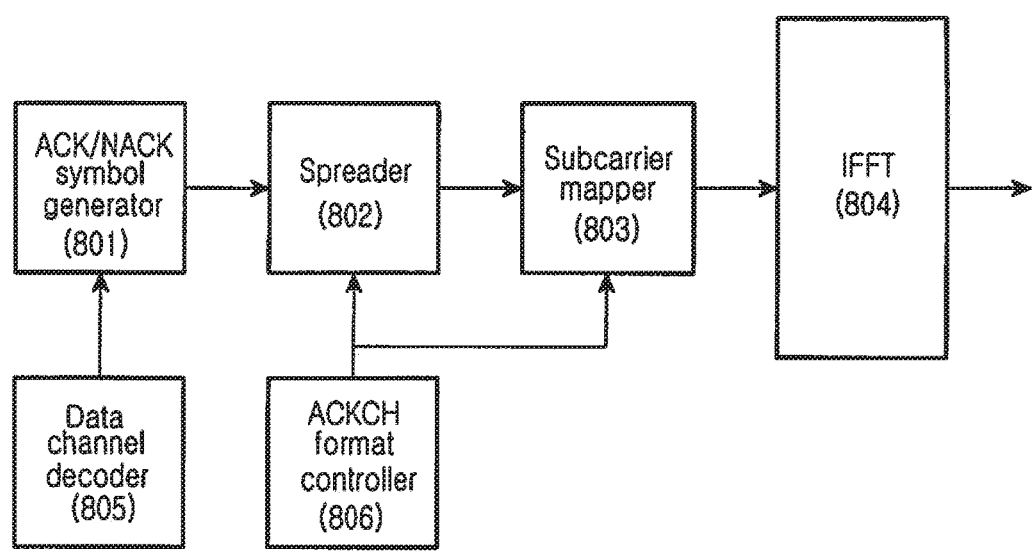
FIG. 8 is a diagram illustrating a structure of the transmission apparatus of the base station of FIG. 6 according to the first embodiment of the present invention.

FIG. 8 is a diagram illustrating a structure of the transmission apparatus of the base station of FIG. 6 according to the first embodiment of the present invention. An ACK/NACK symbol generator 801 generates an ACK/NACK symbol for a data channel according to the decoding success/failure result of a data channel decoder 805. A spreader 802 multiplies the generated ACK/NACK symbol by a CDM sequence corresponding to ACKCH resource allocated for transmission of the ACK/NACK symbol to thereby spread the ACK/NACK symbol. Also, the spreader 802 performs scaling on a level of a transmission ACK/NACK signal as done in step 609 of FIG. 6. An ACKCH format controller 806 determines an ACKCH format, i.e., spreading gain and ACKCH resources for transmission of ACKCH, according to the number of RBs allocated to the data channel and their indexes, and controls the spreader 802 and a subcarrier mapper 803 depending on the determined ACKCH format. The subcarrier mapper 803, under the control of the ACKCH format controller 806, applies the ACKCH symbols spread by the spreader 802 to inputs of an IFFT 804, which are associated with REs of the ACKCH resources. An output signal of the IFFT 804 is finally transmitted to a UE via an Intermediate Frequency (IF)/ Radio Frequency (RF) stage.

Figures 9, 10:
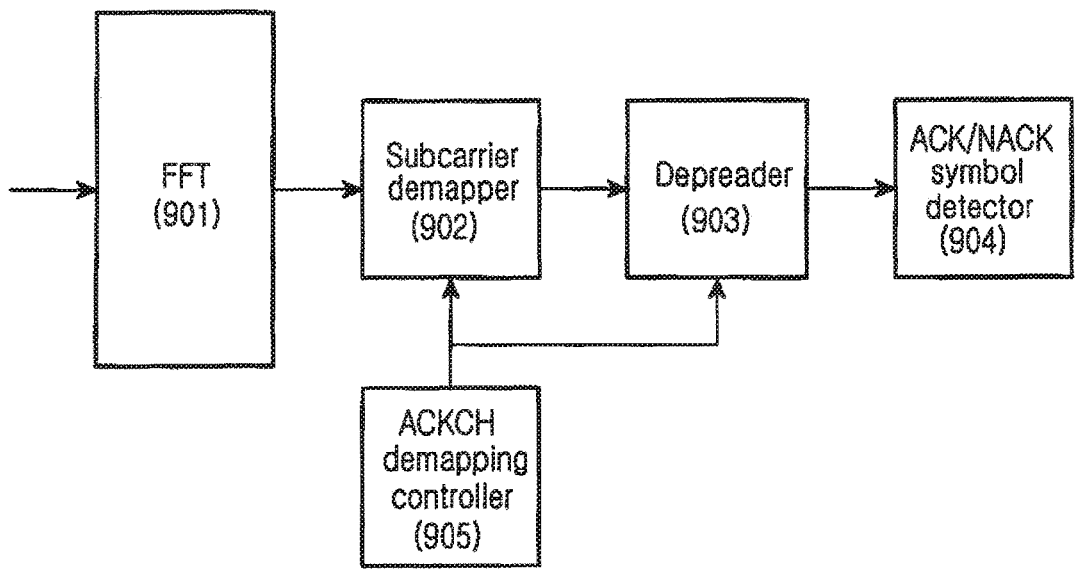
FIG. 9 is a diagram illustrating a structure of a reception apparatus of a UE of FIG. 7 according to the first embodiment of the present invention.
FIG. 10 is a diagram illustrating a format example of a scheduling channel for uplink MU-MIMO transmission according to a second embodiment of the present invention.

FIG. 9 is a diagram illustrating a structure of a reception apparatus of a UE of FIG. 7 according to the first embodiment of the present invention. A signal received at the UE from a base station is first converted into a frequency-domain signal by an FFT 901, and then applied to an input of a subcarrier demapper 902. The subcarrier demapper 902 receives an output of the FFT 901, and outputs spread ACKCH symbols corresponding to ACKCH resources to be received. Since an ACKCH demapping controller 905 can implicitly determine the ACKCH resources according to the number of RBs used for the previously transmitted data channel and their indexes, the ACKCH demapping controller 905 controls the subcarrier demapper 902 and a despreader 903 according thereto. The despreader 903 despreads ACKCH symbols extracted by the subcarrier demapper 902 and applies the despread ACKCH symbols to an ACK/NACK symbol detector 904. The ACK/NACK symbol detector 904 determines whether to transmit an ACK/NACK signal depending on the ACKCH signal despread by the despreader 903.

The foregoing details described in the first embodiment of the present invention can also be applied to the case where ACKCH resources are mapped to CCEs as shown in FIG. 2B. That is, resources to be used for ACKCH transmission are determined according to indexes of CCEs used for transmission of a downlink control channel where a data channel is scheduled for the UE. In the mapping structure of FIG. 3 and the transmission/reception procedures of FIGS. 6 and 7, when the CCEs allocated to the control channel are applied in place of the RBs allocated to the data channel, the details described in this first embodiment can be applied in the same way.

Although a description of the first embodiment of the present invention has been given for allocation of downlink ACK/NACK physical channel resources for uplink data channels, the same can be applied even for allocation of uplink ACK/NACK physical channel resources for downlink data channels when an OFDM transmission technology is applied in the uplink. In addition, when resources are allocated to the data channel in units of two RBs rather than one RB, one ACKCH resource is mapped to two RBs in FIGS. 2A and 2B. Accordingly, the present invention can be applied in units of physical resources allocated to data channels.

A second embodiment of the present invention applies the ACKCH resource allocation method shown in FIG. 3 to uplink MU-MIMO.

MU-MIMO refers to the case where more than two different users are simultaneously allocated the same RBs for data channel transmission. Generally, a base station orders two users having a low spatial channel correlation to transmit the same RBs over data channels, and the reception apparatus of the base station successfully decodes the data channels received from the two users, thereby improving utilization efficiency of uplink physical resources.

FIG. 10 is a diagram illustrating a format example of a scheduling channel for uplink MU-MIMO transmission according to the second embodiment of the present invention. A base station transmits the scheduling channel having the format of FIG. 10 to a UE. UE ID field 1000 indicates ID information of a UE undergoing channel scheduling. Resource allocation information for transmission of a data channel is carried on a resource indication field 1001, Transport Format (TF) information such as Modulation and Coding Set (MCS) level and payload size is carried on a Transport format field 1002, and HARQ-related information such as HARQ redundancy version and process number is carried on an HARQ information field 1003. A value of 0 or 1 is set in a MU-MIMO UE flag bit field 1004 for a UE receiving the scheduling channel. That is, the scheduling information is transmitted to two UEs performing MU-MIMO transmission on the same RBs, and the field 1004 is differently set to 0 and 1 separately for the two UEs.

Therefore, regarding a UE for which the MU-MIMO UE flag bit field 1004 is set to 0 and a UE for which the MU-MIMO UE flag bit field 1004 is set to 1, data channels undergo MU-MIMO transmission through the same RBs but pilot signals for channel estimation for the data channels are mapped to orthogonality-satisfied physical resources before transmission so the base station can receive the pilot signals from the two UEs without mutual interference. Further, for the data packets received from the two UEs, ACKCHs transmitted in the downlink are also set such that they can be transmitted to the two UEs without mutual interference.

Aside from the fields 1000~1004, additional information can be transmitted on the scheduling channel, and the present invention has no limitation on transmission of the additional information. Although the embodiment considers the case where two UEs simultaneously make MU-MIMO transmission on the same RBs, the same can be applied even to the case where N arbitrary UEs simultaneously make MU-MIMO transmission. For example, when MU-MIMO transmission is allowed for a maximum of four UEs, the MU-MIMO UE flag is composed of 2 bits to separately designate four users. When MU-MIMO transmission is allowed for a maximum of N UEs, the MU-MIMO UE flag is set to have $\log_2(N)$ bits. When $\log_2(N)$ is not an integer, the MU-MIMO UE flag preferably has bits, the number of which is the minimum integer greater than $\log_2(N)$.

In order to allow ACKCHs transmitted to the two UEs to be transmitted without mutual interference, for MU-MIMO transmission, more than two RBs are assumed to be allocated herein, and two UEs are assumed herein to simultaneously transmit data channels on the more than two same RBs. Similarly, when N UEs make MU-MIMO transmission, more than N RBs are assumed herein to be allocated.

Figure 11:
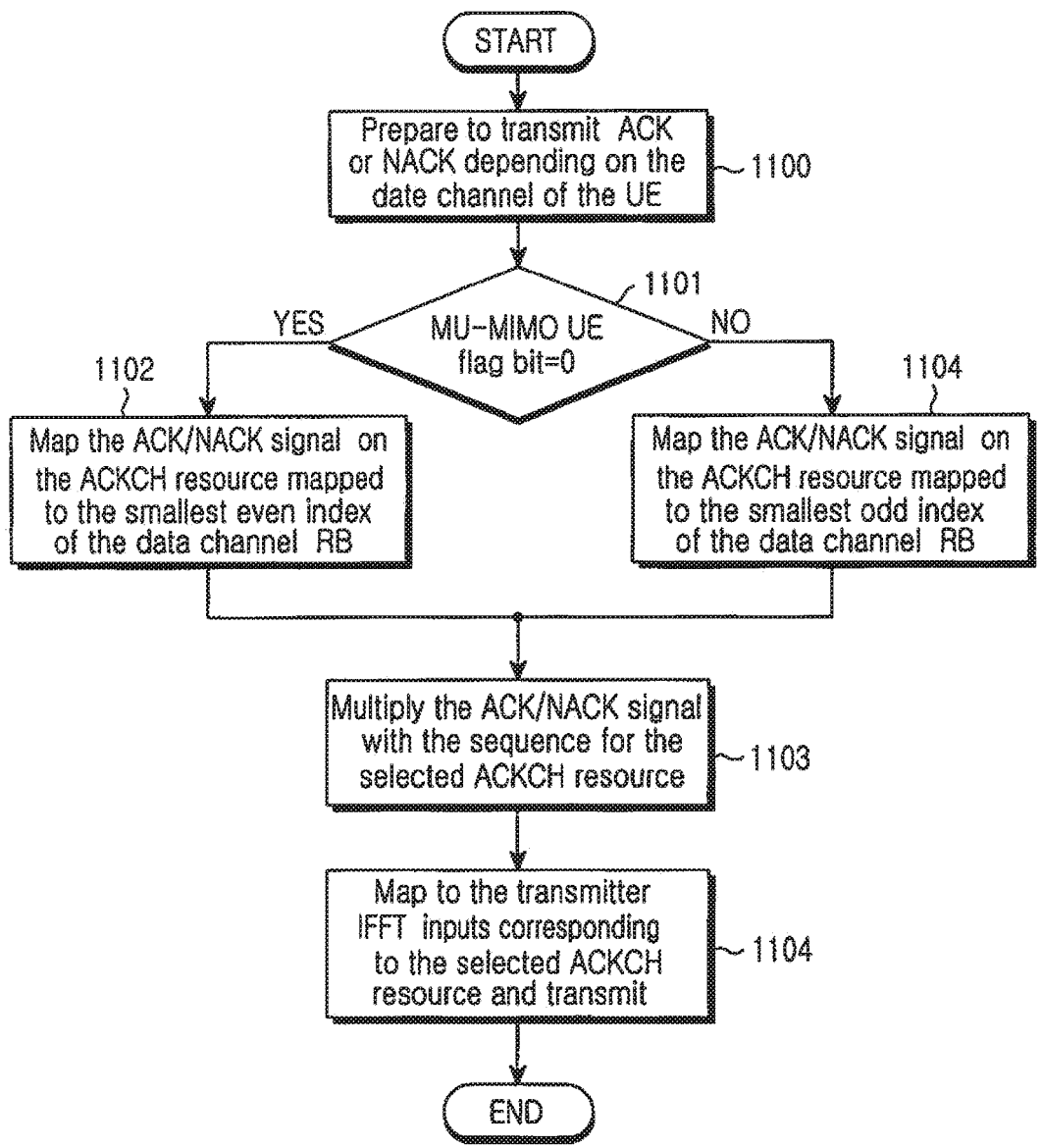
FIG. 11 is a diagram illustrating an ACKCH transmission procedure of a base station according to the second embodiment of the present invention.

FIG. 11 illustrates an ACKCH transmission procedure of a base station according to the second embodiment of the present invention. In the procedure of FIG. 11, for MU-MIMO transmission, more than two RBs are assumed to be allocated, and two UEs simultaneously are assumed to transmit data channels on the more than two same RBs. With reference to FIG. 11, a description will be made of an ACKCH allocation procedure applied separately to each MU-MIMO user. In step 1100, a transmission apparatus of the base station determines whether to and prepares to transmit an ACK/NACK signal depending on the decoding result on a data channel for a corresponding UE. In step 1101, the base station determines whether a MU-MIMO UE flag bit field 1004 of the scheduling channel received from the UE is set to 0 or 1. If the base station determines in step 1101 that the MU-MIMO UE flag bit field 1004 is set to 0, the base station proceeds to step 1102 where the base station maps a transmission ACK/NACK signal to ACKCH resource mapped to the smallest even index among the RBs allocated to the UE. However, if the flag bit is set to 1, the base station proceeds to step 1104 where the base station maps the transmission ACK/NACK signal to ACKCH resource mapped to the smallest odd index among the RBs allocated to the UE. In step 1103, the base station multiplies the ACK/NACK signal mapped to the ACKCH resource by a sequence to be applied to the ACKCH resource. In step 1104, the base station finally maps the ACK/NACK signal multiplied by the sequence to IFFT inputs of the transmitter corresponding to the mapped ACKCH resource before transmission.

Although the flag bit 0 is mapped to the ACKCH resource mapped to the smallest even index among RBs and the flag bit 1 is mapped to the ACKCH resource mapped to the smallest odd index among RBs in this embodiment, the embodiment can alternatively be applied to the opposite case.

Therefore, the ACKCH resources mapped to consecutive RBs are set to use different frequency resources as shown in FIG. 3, and ACKCHs allocated to two MU-MIMO UEs are transmitted using the different frequency resources according to the value of the MU-MIMO UE flag bit field 1004 as described in the procedure of FIG. 11, making it possible to always prevent interference from occurring regardless of the power difference between ACKCHs transmitted to the two UEs.

Figure 12:
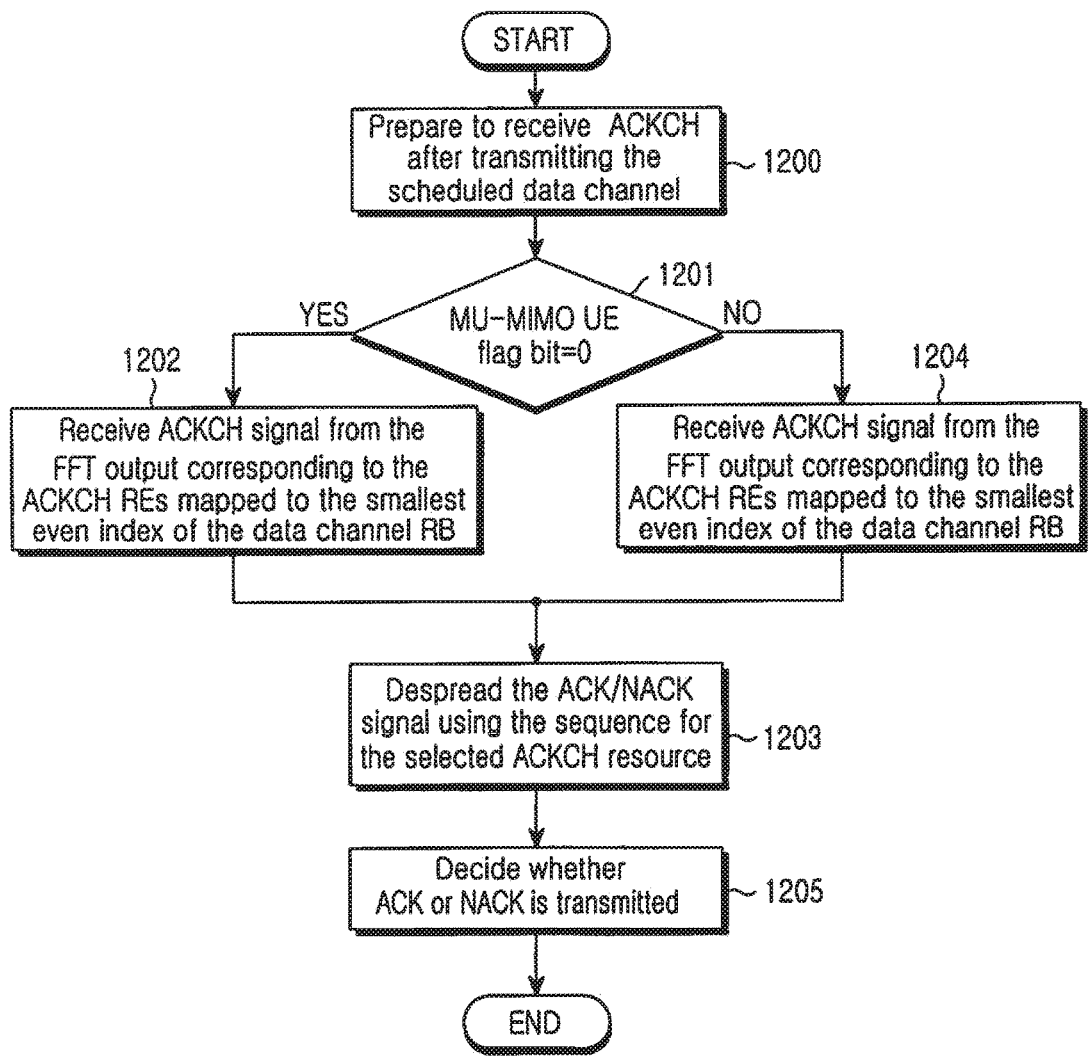
FIG. 12 is a diagram illustrating an ACKCH reception procedure of a UE according to the second embodiment of the present invention.

FIG. 12 is a diagram illustrating an ACKCH reception procedure of a UE according to the second embodiment of the present invention. In step 1200, a UE prepares to receive ACKCH from a base station after transmitting a previously scheduled data channel. In step 1201, the UE determines from which ACKCH resource the UE will receive the ACKCH according to the value of a MU-MIMO UE flag bit field 1004 of a scheduling channel for the data channel. When the value of the MU-MIMO UE flag bit field 1004 is 0, the UE receives in step 1202 an ACKCH signal from FFT outputs of the receiver corresponding to ACKCH resource mapped to the smallest even index among the RBs allocated to the UE. However, if the value of the MU-MIMO UE flag bit field 1004 is 1, the UE receives in step 1204 an ACKCH signal from FFT outputs of the receiver corresponding to ACKCH resource mapped to the smallest odd index among the RBs allocated to the UE. Thereafter, the UE despreads the received ACKCH signal using a sequence applied to the ACKCH resource in step 1203, and finally determines in step 1205 whether an ACK/NACK signal is received.

Although the ACKCH resource corresponding to the smallest even or odd index is selected according to the value of the MU-MIMO UE flag bit field 1004 in the foregoing transmission/reception procedure, other rules can alternatively be established so frequency resources are used as ACKCH resources transmitted to the two MU-MIMO transmission UEs, and the present invention has no limitation thereon.

Regarding the MU-MIMO UE flag bit 1004, when data channels are not scheduled for MU-MIMO transmission, the base station can set the MU-MIMO UE flag bit 1004 to an appropriate value according to the need, thereby controlling ACK/NACK resource allocation. For example, when the UE is allocated several RBs, ACK/NACK channels can be allowed to be transmitted on frequency resources where a less number of ACK/NACK channels are allocated, using the MU-MIMO UE flag bit 1004.

The method described in the second embodiment can be applied even for downlink MU-MIMO in the same way. In this case, a MU-MIMO UE flag bit field is defined in a scheduling channel for a downlink data channel as shown by reference numeral 1004 of FIG. 10, and the base station sets a different value for the MU-MIMO UE flag bit field in each scheduling channel being transmitted to two UEs allocated to the same RBs. Thus, in MU-MIMO, when more than two RBs are allocated to a data channel, the UE transmits an ACK/NACK channel on resources corresponding to the MU-MIMO UE flag bit value among the ACK/NACK channel resources mapped to the RBs.

As is apparent from the foregoing description, the present invention maps ACKCHs mapped to consecutive RBs or consecutive CCEs, to different frequency resources, so REs used for transmission of the ACKCHs are uniformly distributed over the entire system band, making it possible to achieve high frequency diversity gain and inter-cell interference diversity gain and improve ACKCH performance even in MU-MIMO.

In addition, the present invention contributes to a decrease in the number of unnecessary data retransmissions by improving ACKCH performance, and an increase in the system capacity by improving retransmission probability for the data channel failed in its normal reception.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for wireless communication, comprising:
receiving, by a user equipment (UE), a scheduling message comprising first information on at least one resource allocated for uplink transmission and second information;
transmitting, by the UE, data and a pilot via the at least one resource allocated for uplink transmission;
identifying, by the UE, an ACK/NACK resource based on a lowest index among at least one index of the at least one resource allocated for uplink transmission and the second information; and
receiving, by the UE, an ACK/NACK signal in response to the transmitted data using the identified ACK/NACK resource.

2. The method of claim 1, wherein the ACK/NACK resource is identified by an ACK/NACK channel group and an orthogonal sequence within the ACK/NACK channel group.

3. The method of claim 2, wherein the ACK/NACK channel group comprises a plurality of resource element groups and each resource element group comprises a plurality of resource elements.

4. The method of claim 3, wherein the plurality of resource element groups has a cell-specific offset.

5. The method of claim 1, wherein the second information is information on multi-user multi-input multi-output (MU-MIMO).

6. The method of claim 1, wherein the second information is related to the pilot.

7. An apparatus for wireless communication, comprising:
a transceiver configured to receive a scheduling message comprising first information on at least one resource allocated for uplink transmission and second information, transmit data and a pilot via the at least one resource allocated for uplink transmission, and receive an ACK/NACK signal in response to the transmitted data; and
a controller configured to identify an ACK/NACK resource based on a lowest index among at least one index of the at least one resource allocated for uplink transmission and the second information, and control the transceiver to receive the ACK/NACK signal using the identified ACK/NACK resource.

8. The apparatus of claim 7, wherein the ACK/NACK resource is identified by an ACK/NACK channel group and an orthogonal sequence within the ACK/NACK channel group.

9. The apparatus of claim 8, wherein the ACK/NACK channel group comprises a plurality of resource element groups and each resource element group comprises a plurality of resource elements.

10. The apparatus of claim 7, wherein the second information is information on multi-user multi-input multi-output (MU-MIMO).

11. The apparatus of claim 7, wherein the second information is related to the pilot.

12. The apparatus of claim 9, wherein the plurality of resource element groups has a cell-specific offset.

13. A method for wireless communication, comprising:
transmitting, by a base station, a scheduling message comprising first information on at least one resource allocated for uplink transmission;
receiving, by the base station, data and a pilot via the at least one resource allocated for uplink transmission;
identifying, by the base station, an ACK/NACK resource based on a lowest index among at least one index of the at least one resource allocated for uplink transmission and the second information; and
transmitting, by the base station, the ACK/NACK signal in response to the received data using the identified ACK/NACK resource.

14. The method of claim 13, wherein the ACK/NACK resource is identified by an ACK/NACK channel group and an orthogonal sequence within the ACK/NACK channel group.

15. The method of claim 14, wherein the ACK/NACK channel group comprises a plurality of resource element groups and each resource element group comprises a plurality of resource elements.

16. The method of claim 15, wherein the plurality of resource element groups has a cell-specific offset.

17. The method of claim 13, wherein the second information is information on multi-user multi-input multi-output (MU-MIMO).

18. The method of claim 13, wherein the second information is related to the pilot.

19. An apparatus for wireless communication system, comprising:
a transceiver configured to transmit a scheduling message comprising first information on at least one resource allocated for uplink transmission, receive data and a pilot via the at least one resource allocated for uplink transmission, and transmitting an ACK/NACK signal in response to the received data;
a channel decoder for decoding the received data;
an ACK/NACK generator for generating the ACK/NACK signal corresponding to the decoded data; and
a controller for identifying an ACK/NACK resource based on a lowest index among at least one index of the at least one resource allocated for uplink transmission and second information, and control the transceiver to transmit the generated ACK/NACK signal using the identified ACK/NACK resource.

20. The apparatus of claim 19, wherein the ACK/NACK resource is identified by an ACK/NACK channel group and an orthogonal sequence within the ACK/NACK channel group.

21. The apparatus of claim 20, wherein the ACK/NACK channel group comprises a plurality of resource element groups and each resource element group comprises a plurality of resource elements.

22. The apparatus of claim 21, wherein the plurality of resource element groups has a cell-specific offset.

23. The apparatus of claim 19, wherein the second information is information on multi-user multi-input multi-output (MU-MIMO).

24. The apparatus of claim 19, wherein the second information is related to the transmitted pilot.

* * * * *